United States Patent Office 3,296,903
Patented Jan. 10, 1967

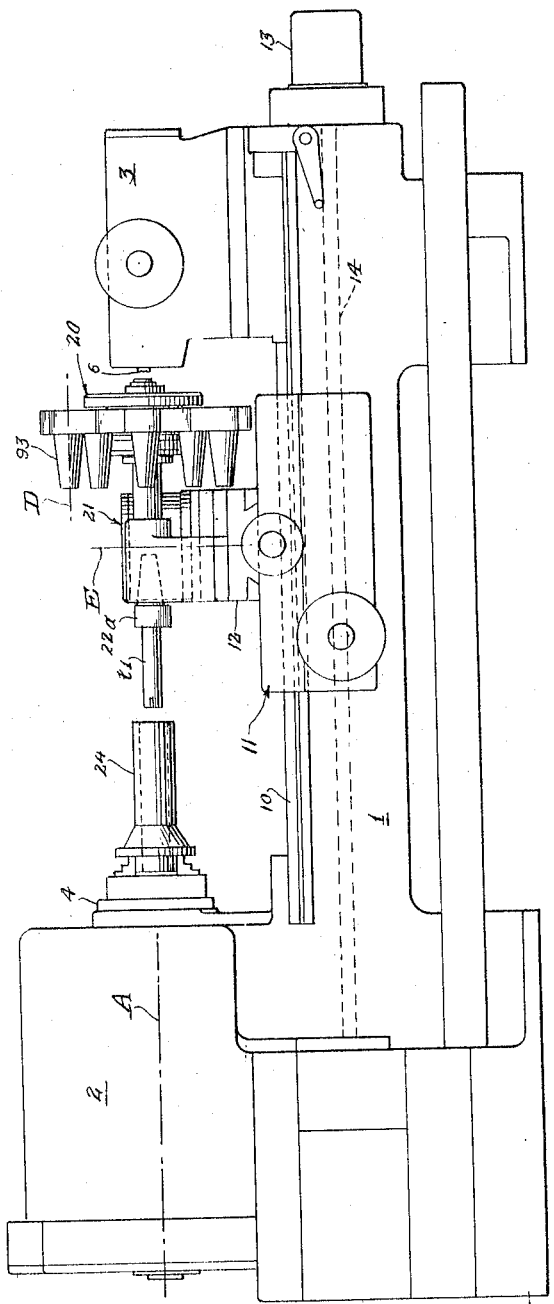

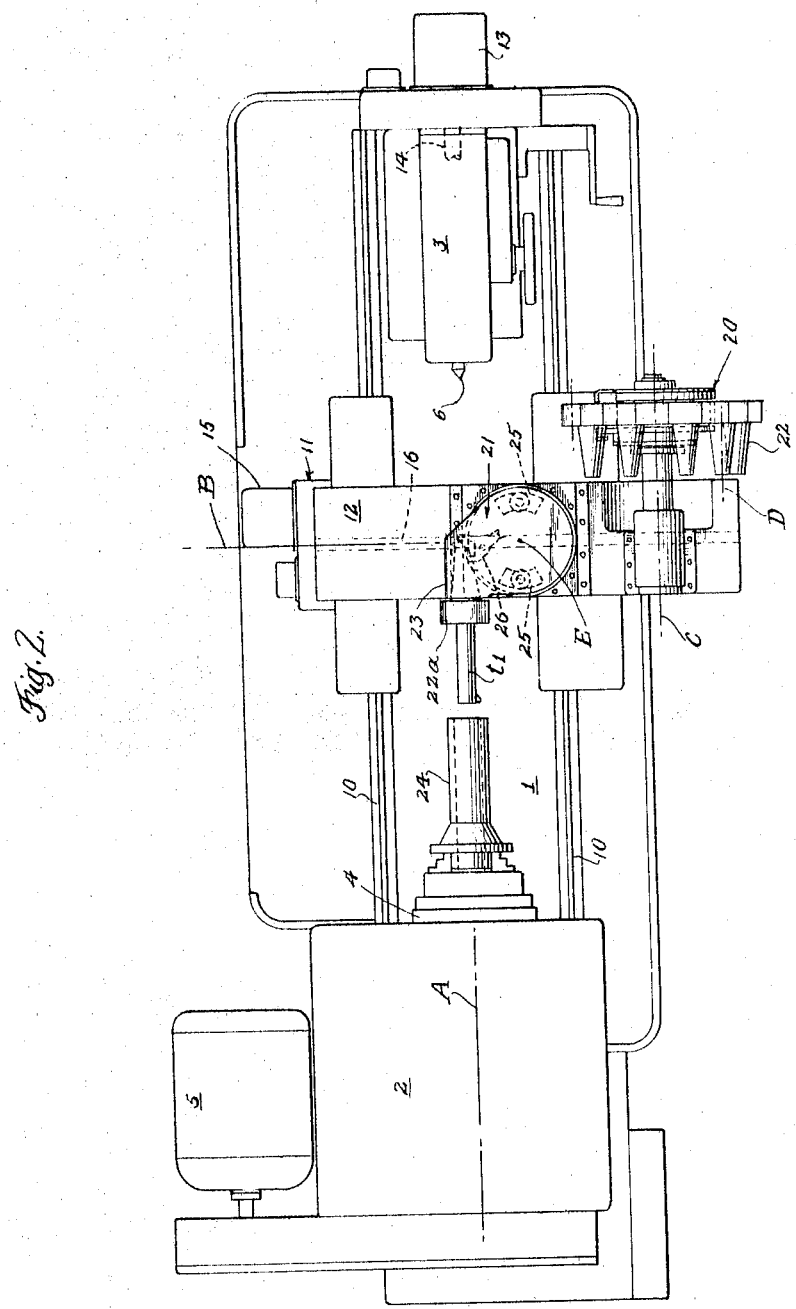

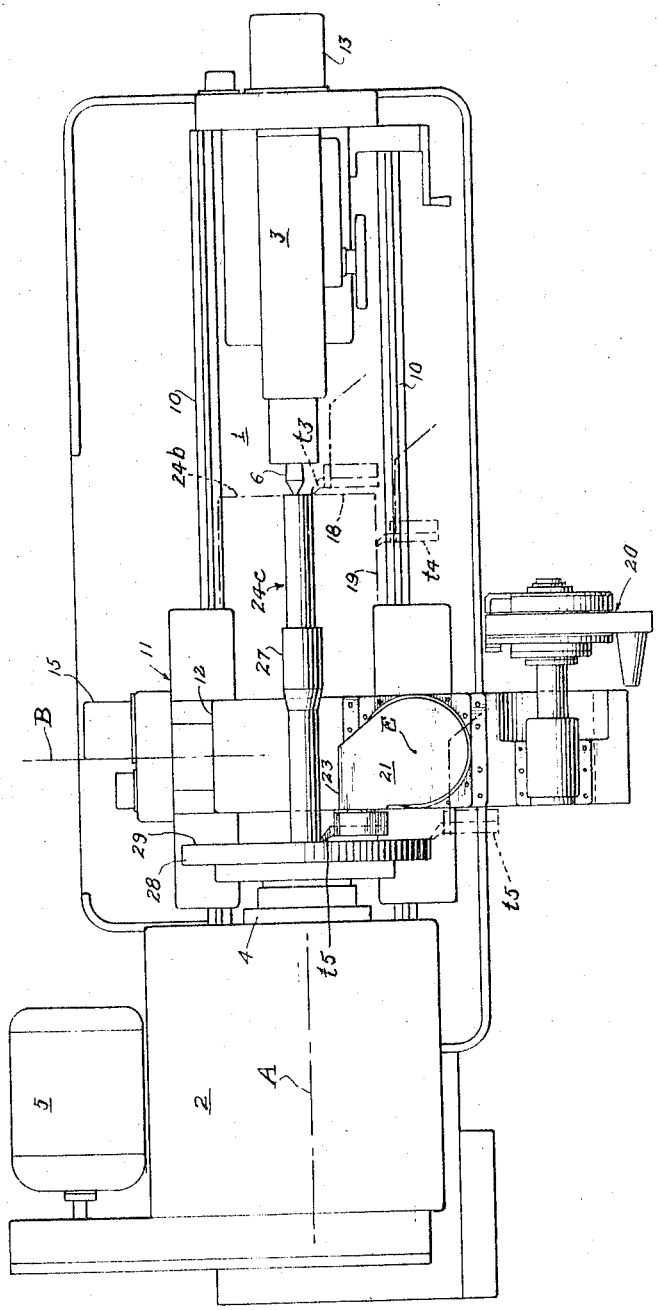

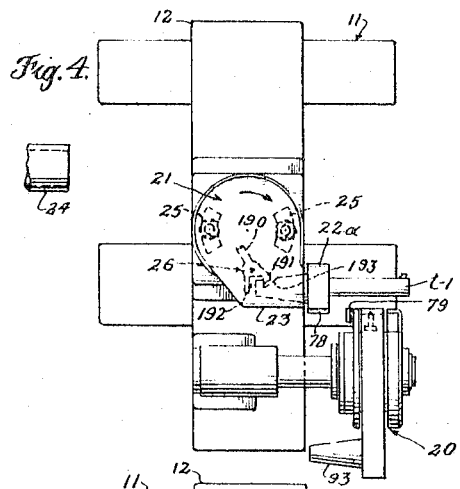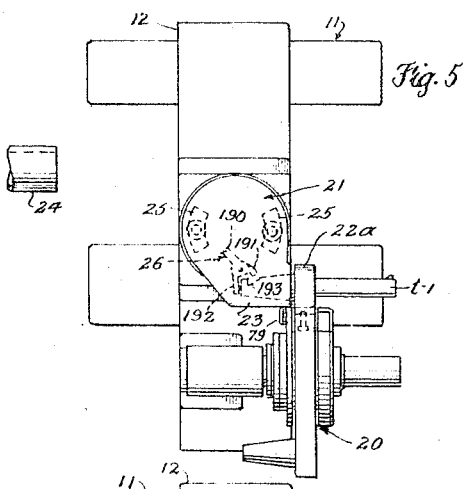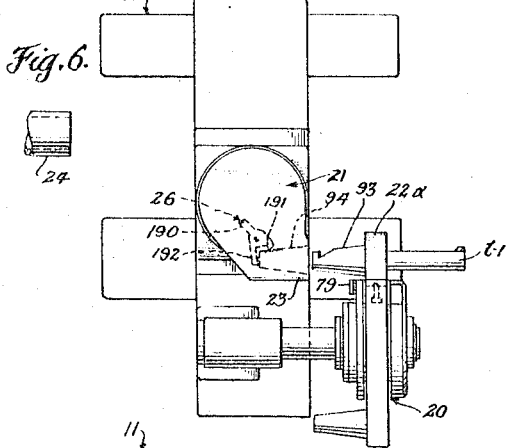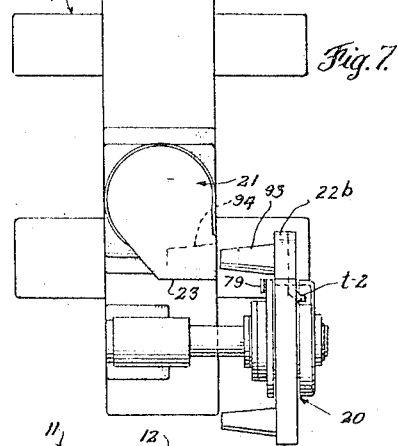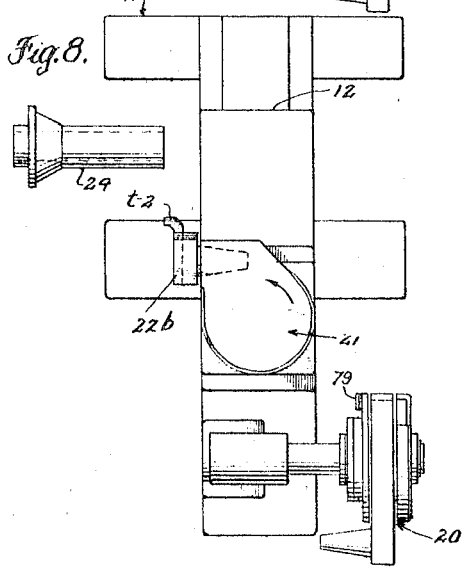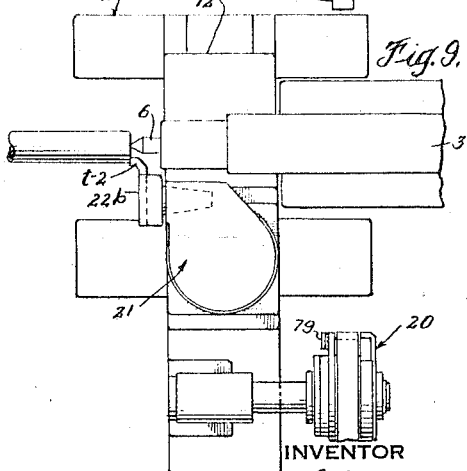

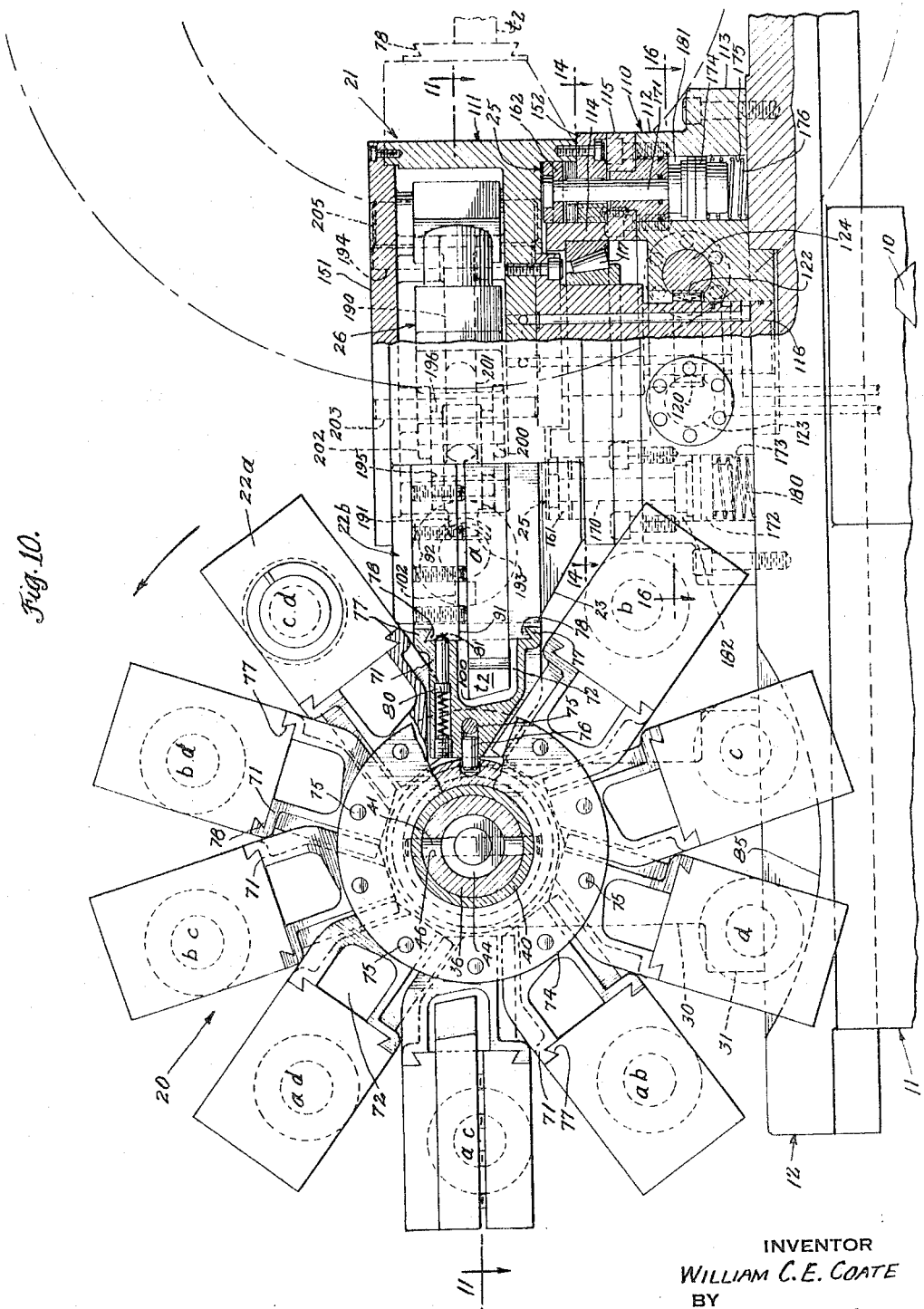

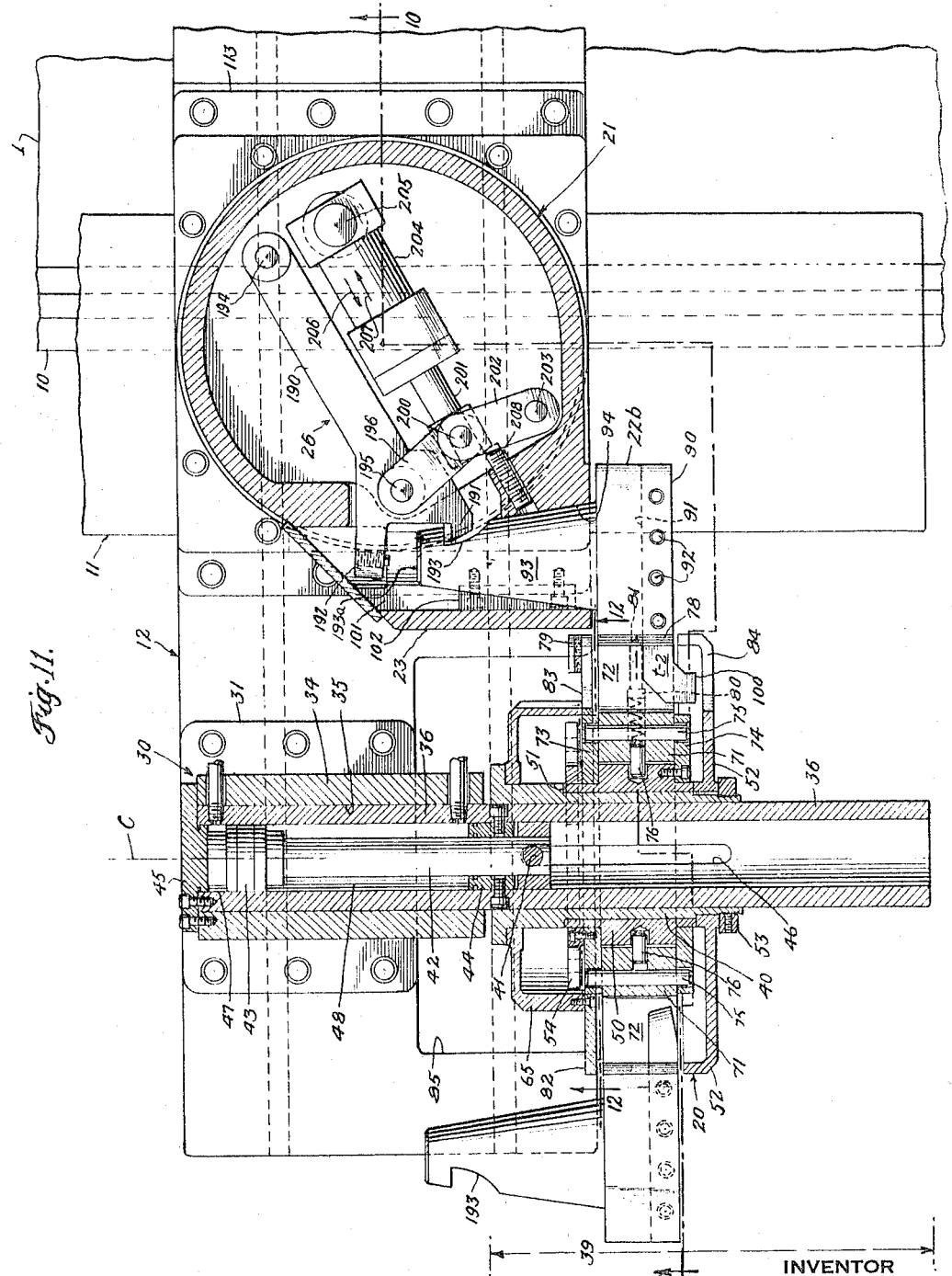

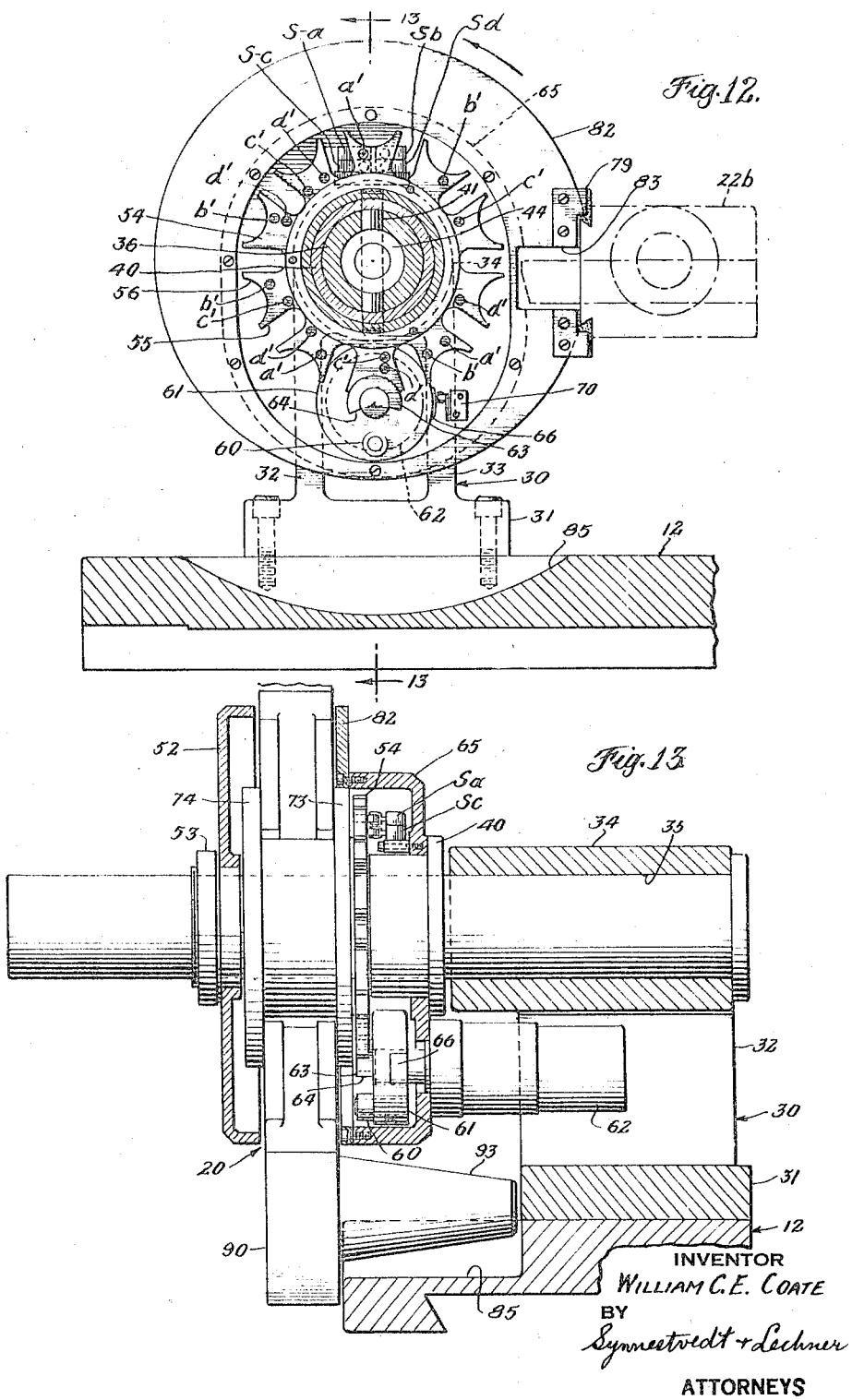

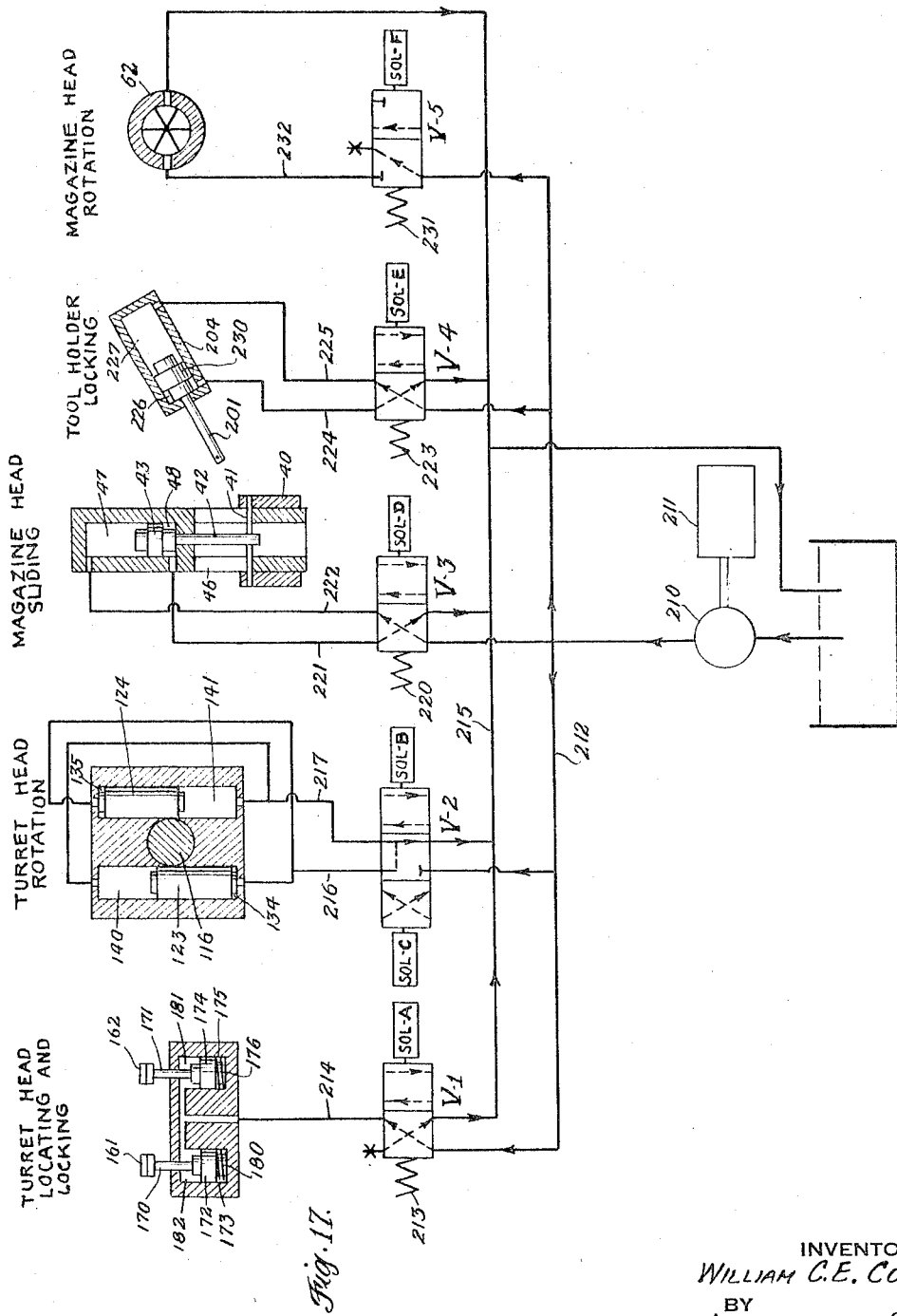

3,296,903
MAGAZINE FOR A MACHINE TOOL
William C. E. Coate, Cincinnati, Ohio, assignor to The Lodge & Shipley Company, Cincinnati, Ohio, a corporation of Ohio
Original application Oct. 5, 1961, Ser. No. 143,076, now Patent No. 3,186,266, dated June 1, 1965. Divided and this application Apr. 15, 1965, Ser. No. 448,400
15 Claims. (Cl. 82—34)

This invention relates to lathes and in particular relates to multiple tool lathes wherein the cycle of operation of the various components of the lathe are automatically controlled as a function of intelligence fed into the lathe as, for example, by punched or magnetic tape or the like.

This application is a division of my copending application Ser. No. 143,076, filed October 5, 1961, and entitled Tool Changer for Lathe Tool Holder, now Patent No. 3,186,266.

More specifically the invention contemplates for a lathe of the kind in question tool changing and supporting apparatus including means for storing a plurality of different kinds or types of tools and for bringing any preselected tool from a storage position to a working position wherein the tool is ready for operating on the work, the apparatus being disposed on the lathe cross slide.

In one aspect the invention contemplates for a lathe of the kind in question, tool changing and supporting apparatus including a magazine constructed to store a plurality of tools, any one of which may be selected for working a piece of stock, together with a rotary turret which has the function of transferring a selected tool from its storage position to its working position and the function of positively locating and holding the tool in working position.

In another aspect the invention contemplates for a lathe of the kind in question, tool changing and supporting apparatus including a magazine for storing a plurality of tools and capable of depositing any one of the tools in a rotary turret which, after receiving the tool from the magazine, rotates to a position wherein it locates and holds the tool for its working operation.

In another aspect the invention contemplates for a lathe of the kind in question, tool changing and supporting apparatus comprising a rotary magazine constructed to store a plurality of tools, for example, tools for turning, facing, boring and the like together with a rotary turret for receiving any one of the tools from the magazine and then holding the same in position for working a part, the transfer between magazine and turret being effected by relative motion between magazine and turret and the positioning of the tool in its working position being effected by the turret rotation.

In another aspect the invention contemplates for a lathe of the kind in question, tool changing and supporting apparatus including a magazine carrying a plurality of tool holders and mounted on the lathe cross slide for sliding motion parallel to the axis of the work, together with a turret also mounted on the cross slide and rotatable to a position wherein the magazine, by moving toward the turret, can deposit or load a pre-selected tool holder therein, and the magazine, by moving away from the turret, can unload a tool holder therefrom, and the turret being mounted on the cross slide to rotate as between the load-unload position and a working position wherein the tool is accurately aligned with respect to the axis of the work.

In another aspect the invention contemplates for a lathe of the kind in question, a magazine for storing a plurality of tool holders, each holder mounting a tool, together with a rotary turret for receiving a pre-selected tool from the magazine and then rotating to a position wherein it locates and holds the tool for its working operation, each tool holder having a floating connection with the magazine which provides for stress-free engagement of parts for the deposit of a tool holder in the turret and for the recovery of a tool holder from the turret.

In another aspect the invention contemplates in a lathe of the kind in question, a rotary magazine mounting a plurality of tool holders, each holder having a tool and occupying a fixed position in the magazine together with a turret for receiving a tool holder and tool from the magazine and then positioning the tool for a working operation, together with code mechanism controlling the rotary position of the magazine so as to place the desired tool holder and tool in registry with the turret for transferring the holder thereto.

In another aspect the invention contemplates in a lathe of the kind in question tool changing and supporting apparatus comprising a rotary magazine mounting a plurality of tool holders, each occupying a predetermined position in the magazine and adapted to be transferred to a turret by the magazine together with code mechanism controlling the rotary position of the magazine so as to place the desired tool holder in registry with the turret for the transfer operation, the code mechanism including a plurality of fixed switches and a plurality of cams rotatable in synchronism with the magazine, the cams being arranged to actuate various combinations of switches as the magazine is rotated, the actuation of the desired combination for a particular magazine position setting up circuits for the stopping of the rotation of the magazine so that the desired tool holder is in registry position with the turret.

In another aspect the invention contemplates in a lathe of the kind in question, a tool changing and supporting apparatus including a rotary magazine having a plurality of tool holders, each holder having a tool and mounted in a carrier by interfitting dovetails on the carrier and on the holder and each carrier having a floating connection with the magazine and each holder being provided with a cone shaped shank which is adapted to mate with a corresponding cone shaped socket in the turret.

In another aspect the invention contemplates for a lathe of the kind in question, tool changing and supporting apparatus comprising a magazine carrying a plurality of tool holders, each holder having a tool and the magazine being mounted on a cantilever type support for movement along an axis parallel the spindle axis and for rotation about its motion axis, the cantilever arrangement accommodates necessary axial magazine motion without structure projecting away from the cross slide and carriage toward the headstock so as to enhance tool visibility and extend the range of the lathe facing operation.

In another aspect the invention contemplates for a lathe of the kind in question tool changing and supporting apparatus including a magazine mounted on the lathe cross slide and slidable back and forth along an axis parallel to the axis of the spindle and the magazine mounting a plurality of tools and tool holders with the axis of each tool holder parallel to the sliding axis, this disposition of the tool holders makes possible the transfer of tool holders as between the magazine and turret by back and forth motion of the magazine along its sliding axis.

A typical embodiment of the invention will be described in connection with the following drawings wherein:

FIGURE 1 is a side elevational view of a lathe incorporating the invention;

FIGURE 2 is a plan view of FIGURE 1;

FIGURE 3 is a plan view of the lathe of FIGURE 1 but with the carriage and cross slide in different positions and a different type of tool mounted in the turret;

Figure 14:
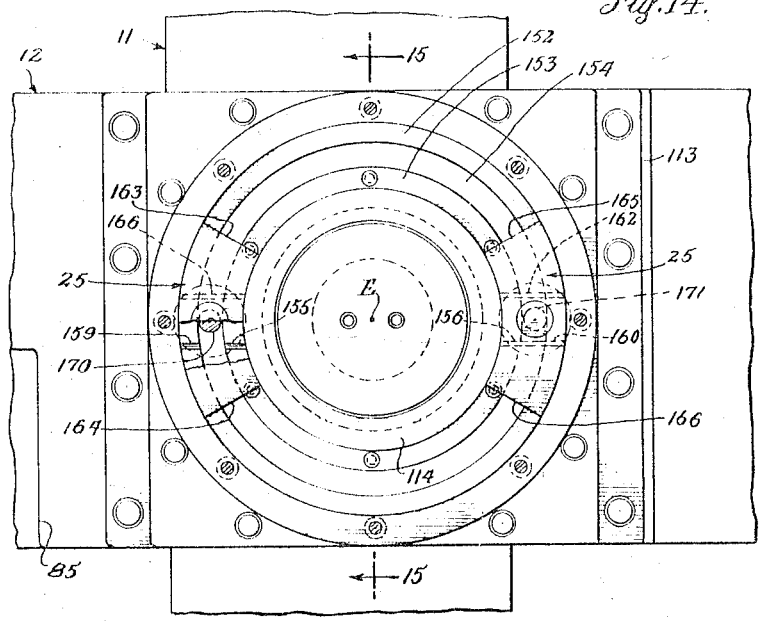
Figure 15:
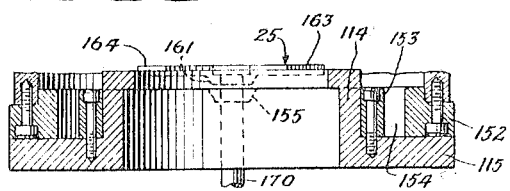
Figure 16:
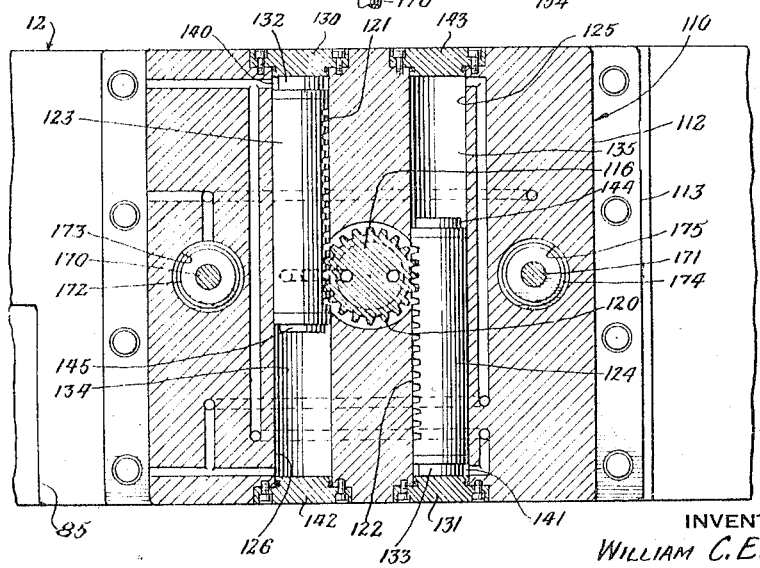

FIGURES 4-9 are fragmentary plan views and illustrating the relative positions assumed by the turret and magazine for the transfer of a tool holder and tool as between the turret and magazine;

FIGURE 10 is an elevational section of the magazine and turret taken approximately on the irregular sectional line 10—10 of FIGURE 11;

FIGURE 11 is a plan section of the magazine and turret taken approximately on the line 11—11 of FIGURE 10;

FIGURE 12 is an elevational sectional view taken along the line 12—12 of FIGURE 11 and illustrating certain of the mechanism for rotating the magazine;

FIGURE 13 is a sectional elevational view taken along the line 13—13 of FIGURE 12 and illustrating the cantilever support for the magazine head;

FIGURE 14 is a cross section taken on the line 14—14 of FIGURE 10 and illustrating the mechanism in the turret for locating the turret so that the tool is accurately aligned with respect to the spindle axis;

FIGURE 15 is an elevational section taken on the line 15—15 of FIGURE 14;

FIGURE 16 is a plan sectional view taken along the line 16—16 of FIGURE 10 and illustrating certain of the mechanism for rotating the turret; and FIGURE 17 is a diagrammatic view illustrating certain of the hydraulic mechanism for operating the magazine and turret.

In FIGURES 1, 2 and 3 I have illustrated the general configuration of an engine lathe which has been adapted for automatic control. The apparatus of the invention is installed on the lathe cross slide.

As shown in these figures, the lathe has a bed 1 on one end of which is mounted a headstock 2 and on the opposite end a tailstock 3. The headstock spindle 4 is rotated about the axis A by the motor 5 driving through various gear arrangements (not shown) in the headstock. The tailstock 3 is adjustable back and forth along the axis of the bed and carries the live center 6. The ways 10 mount the carriage 11 for reciprocating motion over the bed in a direction along the spindle axis A. The cross slide 12 is mounted on the carriage for reciprocating motion over the carriage along the axis B (at 90° to the spindle axis A).

Power for the motion of the carriage 11 along the bed is supplied by a motor 13 operating a ball-type lead screw indicated by the dash lines 14. Power for the motion of the cross slide 12 on the carriage is supplied by a motor 15 which operates a ball-type lead screw indicated by the dotted lines 16.

The operation of the carriage motor 13, the cross slide motor 15 and the mechanism in the headstock for determining the spindle speed are all under the control of an automatic control system for example, a numerical control system. Inasmuch as such systems are known to those skilled in the art and form no part of the present invention, per se, it is believed unnecssary to comment further on the same, except to say, that the cycle of operation of the magazine and turret of the present invention is determined by the automatic control system. As will be described later, cycle control is effected by the energizing and de-energizing of solenoids.

With the indicated lathe configuration the plane of motion of the cross slide is horizontal. However, it will be understood that the carriage may support the cross slide (hence the magazine and turret) for operation in a plane which is not horizontal.

The embodiment of the invention illusrtated herein includes (FIGS. 1-3) a magazine element generally indicated by the numeral 20 and a turret element generally indicated by the numeral 21. Both the magazine and the turret are fixed to the cross slide 12. The magazine is connected with the cross slide so as to be rotatable about an axis C, this axis lying in a plane containing and parallel to the rotational axis A. The magazine carries a plurality of tool holders and tools generally designated by 22 which rotate with the magazine about the axis C. Each of the tool holders is identical in size and shape, being in the form of a truncated cone with the axis D of each cone being parallel to the axis C. As shown in FIGURE 10, the tool holders are spaced from one another in a direction around the periphery of the magazine. The magazine is also mounted for reciprocating motion along the axis C. Each holder can be moved in the direction of the axis D (or C) for insertion or removal from its position on the turret.

The turret 21 is adapted to be rotated about an axis E which is perpendicular to the plane containing the axes A and C. The turret has a tool holder mounting section or lobe 23 which is adapted to receive any one of the tool holders from the magazine 20 and support the holder and tool in a desired working position. For example, in FIGURES 2 and 3 the lobe 23 supports the tool holder 22a carrying the boring bar and tool assembly t–1. As shown in these figures, the turret has been rotated to a working position; a position wherein the tool t–1 is set up for performing a boring operation on a workpiece such as the workpiece 24. The turret can also be rotated (clockwise as viewed in FIGURES 2 and 3) to a load-unload position; i.e., a position wherein the lobe is oriented with respect to the magazine so that a tool holder can be transferred from the turret to the magazine or alternatively a tool holder transferred from the magazine to the turret (see the turret positions in FIGURES 4–7). For the transfer operation, the magazine is rotated until the proper holder is in registry with the lobe 23.

When the turret is in the load-unload position and the magazine in registry position, a tool holder is deposited in or removed from the turret by virtue of the magazine motion along the axis C. For example, a tool holder is inserted in the lobe 23 of the turret (assuming that the magazine has rotated until the desired holder is in registry with the lobe 23) by moving the magazine along the axis C (toward the headstock) until the tool holder has engaged with lobe 23 and the magazine is backed off leaving the tool holder in position. A tool holder is removed from the turret by the magazine moving up to the turret to grip the tool holder (in loosen condition in lobe) and then back off carrying the tool holder and tool with it.

With the above in mind then it is believed that a better understanding of the arrangement and functioning of the invention will be afforded by a description of the sequence of operation involved in transferring a desired tool from its position in the magazine to its working position in the turret.

With reference to FIGURES 1 and 2, assume that a boring operation has been completed and the carriage and cross slide have traversed away from the work. In order to unload the holder 22a, it is necessary to rotate the turret to bring the same into the load-unload position. In order to do this, the locating and locking mechanism (generally indicated by numeral 25) is released so that the turret is free to move. The turret then rotates 180° (clockwise as viewed in FIGURE 2) or to the load-unload position as shown in FIGURE 4.

At this time the magazine is moved from its position as shown in FIGURE 2 toward the headstock and while the magazine is moving, the tool holder locking mechanism in the turret (indicated by the dotted lines 26) loosens the holder. When the magazine is up to the turret as shown in FIGURE 5, the tool holder and magazine are interengaged. The magazine then moves back toward the tailstock pulling the tool holder away from the turret as indicated in FIGURE 6.

When the magazine is all the way back toward the tailstock, the magazine is rotated till such time that the next tool to be used is brought into registry. For example, in FIGURE 7 the magazine has been rotated so that the tool holder 22b which carries the tool t–2, is in position for insertion in the turret. For this purpose the magazine is moved toward the headstock or until the conical shank of the holder fits into the conical cavity in the lobe 23. The locking mechanism 26 in the turret then operates to firmly lock the tool holder. Then the magazine is moved back toward the tailstock and the turret is rotated counterclockwise until it reaches its working position where it is precisely located and locked by mechanism 25 (see FIGURE 8). After the turret is locked in working position, the carriage and cross slide are then moved to bring the tool in position for the next operation. For example, in FIGURE 8 the cross slide has been moved outwardly and the carriage is just starting to move toward the headstock. As the carriage approaches the headstock, then the tool will move inwardly to make contact with the workpiece 24.

The workpiece 24 as illustrated in FIGURES 1, 2 and 8 may require only a rough boring operation and therefore only a single boring tool, such as the tool 22a, is used. However, if a finished boring were needed, a finish boring tool instead of the tool t–2 could have been inserted in the turret. The outside surface of the work 24 may require both a rough and finished cut, thus the tool t–2 may be a roughing tool. After this tool has finished its cutting, it may be removed from the turret and placed back in the magazine and then a finishing tool from the magazine placed in the turret and moved into working position for a finishing operation.

The versatility of the turret structure from the standpoint of interference free positioning of the tool for various types of operations is generally illustrated in FIGURES 3 and 9.

In FIGURE 9 it will be seen that the tool t–2 can face and/or turn a part having a diameter such that the tool is operating very close to the tailstock 3 and live center 6. The shape and orientation of the tool holder and turret offers practically no interference to this type of tool performance.

In FIGURE 3 the dot-dash lines 24b represent a workpiece whose diameter is the largest for the over-the-cross slide swing of the lathe. The tool t–3 can face the end 18 of the workpiece from a point substantially near the live center 6 to a point at the periphery. A tool t–4 can face the outside surface 19 with equal facility.

Further, in connection with FIGURE 3, the workpiece 24c has a shaft section 27 which includes several portions requiring turning and contouring and it will be apparent that the shaft section can be machined in the usual manner without interference.

The workpiece 24c also includes the flange 28 whose diameter is the largest for the over-the-bed swing of the lathe. The surface 29 on the flange is to be faced and for this purpose, the tool t–5 can move from its peripheral position (shown in the dotted lines) to its inner most position (shown by the full lines).

The facing of the flange 28 as indicated in FIGURE 3 illustrates the advantage of the turret lobe 23 in mounting the tool holder for the tool to be spaced outwardly from the turret and cross slide, so that neither the turret nor cross slide offers any interference to maximum diameter facing. Additionally, the operation illustrates the advantage of the cantilever construction of the magazine which, as mentioned heretofore, has the advantage of not having any protuberances extending toward the headstock, thus interfering with a facing operation such as the one under consideration.

From the foregoing it will be seen that the apparatus of the invention provides a relatively fast, straightforward tool changing system; i.e., a system which stores a plurality of tools and quickly conditions a selected tool for working.

With the above in mind then the structural details of the magazine and turret will next be described in connection with FIGURES 10, 11, 12 and 13.

The magazine structure includes a support or frame 30 comprising the base 31 fixedly secured to the cross slide 12 and two uprights 32 and 33 which terminate in an annular section 34 having a bore 35. Disposed within the bore 35 is a tube 36 which extends far beyond the annular section 34 in a cantilever effect. For example, see the dimension 39 in FIGURE 11 which indicates the extension of the tube 36. Further as indicated in FIGURE 11, the axis of the tube 36 is co-axial with the axis C mentioned in connection with FIGURES 1 and 2.

The tube 36 functions to support the head or tool holder part of the magazine which has a rotary motion around the axis C and a sliding motion along the axis C. Further, the tube forms a cylinder for certain hydraulic mechanisms which control the axial motion.

The tube 36 carries a bushing 40 which is adapted to slide back and forth along the tube in the direction of the axis C. The sliding bushing 40 is moved by a pin 41 fixed to the piston rod 42 of the piston 43. The piston 43 reciprocates back and forth in the cylinder formed by the tube 36 and the end pieces 44 and 45. The motion of the pin 41 with respect to the tube 36 is accommodated by the slot 46.

Motion of the piston 43 is controlled by the fluid in chambers 47 and 48.

The sliding bushing 40 carries another bushing 50. The bushing 50 is adapted to rotate with respect to the bushing 40. Then rotary bushing 50 is confined against axial movement by a shoulder 51 on the sliding bushing 40 and by the cover member 52. The cover member 52 is held firm on the sliding bushing 40 by the nut 53.

As will be apparent shortly, the rotary bushing 50 carries various tool holders and the bushing is adapted to be rotated in step-by-step fashion so as to sequentially bring tool holders into registry with the turret for the transfer operation. The rotary drive means includes a coding system which is arranged to control the step-by-step rotation so that the correct tool holder and tool will be in registry with the turret lobe 23.

For the above purposes then the rotary bushing 50 is connected to a spider 54 (FIGURE 12) which has a plurality of drive slots 55 (the number of drive slots corresponding to the number of tool holders) and a plurality of locking slots 56. The drive slots 55 are adapted to be serially engaged by a pin 60 mounted on a rotor 61 driven by a hydraulic motor 62 (FIGURE 12). As viewed in FIGURE 12, the rotor moves counterclockwise. Each time the pin 60 engages one of the drive slots 55, the spider 54 will be rotated 36°. The 36° motion begins when the pin 60 first enters a drive slot 55 and ends when the pin becomes disengaged with the slot. Each time the spider is moved to a position, it is held by the lug 63 until such time as the pin is ready to again move the spider. The lug 63 is also mounted on the rotor 61 and is adapted to interengage with the locking slots 56. When the pin 60 has completed its 36° movement of the spider or just about to leave the drive slot, the edge 64 of the lug 63 is just about ready to enter the adjacent locking slot. With further rotation of the rotor 61, the lug 63 simply rotates in the slot (relative to the spider) and in doing so, holds the spider fixed in the position in which it was placed by the pin 60. By the time the pin has moved to engage another drive slot, the lug is out of the locking slot so that the spider is free to turn. Thus if the rotation of the motor 62 is stopped after the pin leaves a drive slot, the rotary bushing 50 (and the tool holders connected thereto) will remain fixed in position.

The above described elements 54, 55, 56, 60, 61 and 63 constitute a so-called Geneva drive. As will be apparent from FIGURE 13, the spider 54, the rotor 61, etc. are disposed within a cover 65 which is fixed to the sliding bushing 40. The motor 62 is secured to the cover 65.

In order to stop the rotation of the motor 62 so that the proper tool holder is in registry with the turret, the invention contemplates a code system comprising switches and switch activating arms operatively associated with the Geneva drive.

This coding system includes four switches S–a, S–b, S–c, S–d, which are fixed to the housing 65. When one particular switch or a particular pair of switches is actuated (by arms or cams mounted on the spider 54), the circuit controlling the hydraulic motor 62 is setup for stopping the rotation of the motor, hence, the rotation of the spider and rotary bushing 50. The positions of the magazines when each tool holder is in registry position are coded in the sense that when a tool holder reaches the horizontal or registry position, a particular switch or combination of switches will be actuated to set up the circuits for stopping the hydraulic motor. Thus in FIGURE 10 the code of each position of a work holder in the magazine has been designated by the letters a, b, c, d and combinations thereof. When the tool holder having the designation a arrives at the registry position, an arm a' on the spider will have actuated the switch S–a. When a tool holder having the code b in FIGURE 10 arrives at the horizontal or registry position, the cam or arm b' will have actuated the switch S–b. The same pattern is repeated as the various tool holders come into the registry position.

It is desirable to stop the operation of the motor 62 about the time the pin 60 is approximately mid-way between the adjacent drive slots (see FIGURE 12). The engagement between one or more of the arms a', b', etc. with the switches S–a, etc. takes place just as the pin 60 is leaving one of the drive slots. This sets up the circuit for stopping the motor but actual stoppage is caused by another switch. After the pin 60 is about mid-way between the drive slots, a cam 66 (FIGURES 12 and 13) on the rotor engages the switch 70 and the actuation of the switch 70 causes stoppage of the motor 62. For again operating the motor 62 the cause rotation of the rotary bushing 50, a master switch in the circuit containing the switch 70, one or more of the switches S–a, etc. is opened to counter the effect of the switches 70 and S–a, etc.

Each of the tool holders is connected into the magazine by way of a floating carrier. Each of the carriers is identical in construction and only the details of the carrier 71, now holding the tool holder 22b, will be described. As seen in FIGURE 10, the carrier 71 is somewhat U-shaped in cross section, the U being formed by an access slot 72 which runs clear through the carrier. This access slot 72 accommodates axial motion of the carrier with respect to the outer end of the tool t–2 mounted in the holder 22a.

With reference to FIGURE 11, it will be seen that the rotary bushing 50 includes a pair of disks 73 and 74. These two disks and the bushing 50 form an annular channel about the rotary bushing 50. The various carriers 71 are disposed in the channel. The carrier makes a floating engagement with the rotary bushing 50 and the plates 73 and 74. This is done by way of the pins 75 and 76. The pin 75 is press-fitted into the body of the carrier and extends into apertures in the plates 73 and 74. The apertures in the plates are of a diameter somewhat larger than the outside diameter of the pin. Thus the carrier has some degree of generally radial motion with respect to the plates. The pin 76 is press-fitted into the carrier and extends into an aperture in the rotary bushing 50. The diameter of this aperture is somewhat larger than the outside diameter of the pin so that the carrier has a slight degree of generally axial motion with respect to the bushing 50.

The carriers have a sliding connection with the tool holders as explained following. As best seen in FIGURE 10, the extremity of the carrier is provided with dovetails 77 which mate with dovetails 78 on the tool holder 22b. The axes of the dovetails are oriented generally parallel to the axis C. It will be apparent that the dovetail arrangement provides for relative motion as between the magazine and the tool holder in a direction along the axis C. For example, when a tool holder is in the turret, the magazine can move toward the tailstock until the dovetails 77 and 78 are engaged and the plunger 80 is in detent 81 or with the tool holder held fast in the turret, the turret can move toward the tailstock, the motion being accommodated by the dovetails 78 sliding over the dovetails 79.

For locating and maintaining the tool holder in the proper position in the carrier, I have provided a spring loaded cam 80 which operates in a detent 81 in the tool holder.

Again with reference to FIGURES 11 and 13, it will be noted that housing 65 carries a disk-like member 82 which extends radially outwardly about the same distance as the cover 52. Both the cover 52 and the disk 82 are slotted in the vicinity of the carrier slot 72. With reference to FIGURES 11 and 12 the slot for the disk 82 is indicated at 83 and the slot for cover 52 is indicated at 84. These slots accommodate relative motion as between the magazine and the tool holder.

For present purposes the components including the sliding bushing 41, the rotory bushing 50, 73 and 74 and covers 52, 64 and 82 can be considered as a magazine head which is capable of sliding motion along the axis C and (with the exception of the covers) capable of rotary motion about the axis C.

The cover 52 and the disk 82 are spaced from one another to accommodate the rotary motion of the tool holders. This space between the disk and cover constitutes a peripheral slot through which the tool holders extend and rotate. It will be observed that with the exception of a time when a tool holder is in the registry position (and aligned with the slots 83 and 84), the disk 82 and the cover 52 serve as barriers against the possibility of a tool holder moving axially (along the axis C) out of its carrier. Such axial motion might be possible, for example, if the detent mechanism failed to properly operate.

The magazine structure, as above described, has several important functional and operational advantages. For example, it will be observed that the portion of the magazine which rotates and moves back and forth along the axis C is supported on a cantilever member which extends toward the tailstock. With this construction the magazine has full freedom for moving along the axis C for inserting a tool holder in the turret and for removing a tool holder from the turret. With this motion, however, it will be observed that there is no part of the mechanism which extends forwardly beyond the cross slide toward the headstock. With this construction there are no protuberances which might interfere with the ability of the tool to face or turn large diameter parts or interfere with full freedom of vision for watching the tool perform.

In the particular embodiment shown, the cross slide 12 is provided with an undercut 85 to accommodate the outer extremities of the tool holders when the magazine is in position for inserting or removing a tool holder.

Certain of the structural details of the tool holders are described following:

Each of the tool holders mounted in the magazine has a head portion which is arranged to hold a particular type of tool. For example, some of the holders may have heads which support a boring type tool and other heads may be arranged to support a tool such as turning tools or the like. For example, the holder 22b (FIGURES 10 and 11) has a head portion 90 with a slot 91 carrying the tool t–2, the tool being fixed in the slot by the set screws 92.

Each of the tool holders has a cone shaped shank portion. The shank of each holder is identical in construction. For example, the tool holder 22b has a cone shaped shank portion 93. All of the other tool holders have identical shanks. The shank portion of any tool holder is adapted to fit into a corresponding cone shaped socket 94 formed in the turret or more particularly in the lobe 23.

Each tool holder and the turret lobe are arranged so that when a shank is inserted in the socket, the tool tip (for example, the tool tip 100 of the tool *t*–2) lies in a plane (horizontal in this instance) containing the rotational axis of the spindle or the work and occupies a known axial and radial position in this plane. The condition of making the tool tip lie in the spindle plane is provided by a keyway 101 in the lobe and the key 102 fixedly secured to the shank 93. The latter condition is brought about by grinding the surfaces of the shank 93 and the socket 94 so that when the shank is locked in the socket, as by the mechanism 26, a datum or line on the shank and a datum line on the socket coincide, the datum point on the socket occupies a known and fixed relationship (axially and transversely) with respect to the rotational axis of the workpiece.

Any tool which is mounted in a holder is preset prior to the holder being loaded in the magazine. For example, the holder is set up in a jig and then the tool is aligned in the holder so that its working tip lies at a fixed and predetermined point with respect to the key in the shank. Since the keyway in the socket has a known location with respect to a horizontal plane containing the spindle axis, the tool tip, the holder, when inserted into the socket, will lie in the plane. Also the jig is equipped so that the working tip is at a known axial and radial distance with respect to the datum line on the shank.

It will be understood, of course, that orienting the tool tip in the correct position is a vital necessity for correct operation of the automatic machine.

In connection with the foregoing orienting of the tool tip it will be understood that the tool holder locking mechanism 26 (to be described in detail later) bears an important cooperative relationship with the socket, shank and keyway in that the locking mechanism pulls the shank in close engagement with the socket and always exerts substantially the same amount of locking pressure. This aids in causing the datum points to coincide and the locking mechanism cooperates with the key and keyway for holding the shank against the rotation.

The conical shape of the tool holder shank and turret socket have another advantage from the standpoint of accurate tool alignment in that they are relatively chip free. As is well understood by those skilled in the art, cutting operations usually result in chips collecting on the various parts of the lathe adjacent the tool. In the present instance chips may collect on the top of the turret and on the head of the tool holder. These chips are removed (by an air blast) prior to the turret being rotated from the working position to the transfer position. However, if any such chips are not removed and tend to fall downwardly on the shank (or socket) when the shank is removed from the socket, the conical shape of the surfaces of the shank (and socket) allows the chips to fall away. Further in this regard, the conical form of the shank and socket surfaces permits these surfaces to be completely enclosed during the working operation and thus are not exposed to falling chips.

The floating or yielding suspension of the carrier on the tool holder carriers is an important part of the invention particularly as respects the function of transferring tool holders as between the magazine and turret. For example, it will be apparent that dovetails (or equivalent mechanism) on the tool holder and on the carrier to be in exact alignment when, for example, the magazine was moving toward a holder which was locked in the turret. Otherwise, any slight misalignment could impose very severe stresses on the connecting parts causing distortion with consequent inaccuracy and breakage. Since the floating action provides for a slight "give" any slight misalignment between the dovetails will be compensated for by motion of the carrier.

The floating action of the tool holder carriers is especially useful and advantageous in the operation of removing a tool holder from the turret. As will be explained later, when the tool holder is released by the locking mechanism 26, a force is exerted on the holder so as to move the same slightly away from the socket 94. The holder is then, for all practical purposes, loose in the socket and thus can be easily removed when the magazine is moved toward the tailstock. Without the floating action of the carrier, it would be virtually impossible to loosen the work holder in the socket. If the tool holder were not loosened in the socket, a very large force would have to be exerted by the magazine to pull the shank away from the socket and then would necessitate heavier, costlier and complex mechanism than I have shown. In connection with the foregoing, it is pointed out that the yielding or the yielding floating suspension for the carriers and the loosening of the tool holder prior to removal, permits each tool holder to be held in position on its carrier by the simple detent mechanism, such as the cam and plunger 80 and 81.

Thus the yielding or floating suspension of the tool holders on the magazine and the loosening of the tool holder in its socket prior to removal cooperate with one another in making for a relatively inexpensive, a positive and essentially fool proof structure for effecting transfer of a tool holder as between magazine and turret.

In passing, it is pointed out that when the turret is in the working position, the dovetails 78 on the tool holder (see FIG. 10) are subject to the possibility of collecting chips. It is highly desirable to remove such chips (if any) from the dovetails 78 prior to engagement with the dovetails 77 on the carrier. For this purpose I have provided a wiper mechanism 79 (FIGS. 11 and 12) on the disk 82 which operates to clear the dovetails 78 when the magazine head moves up to the transfer position.

The various structural details of the turret mechanism will be described below.

In general, the turret has a bottom or base section 110 which is generally square in shape and is fixed to the cross slide 12 together with a top part or head section 111 which is generally round in shape and is rotatably mounted on the fixed bottom part.

With reference to FIGURE 10 the base section 110 of the turret comprises a square mounting block 112 having flanges 113. Disposed on top of the mounting block is a bearing ring 114 having square flanges 115. Disposed within the bearing ring and the mounting block is the turret shaft 116. The shaft 116 is rotatably supported by the radial thrust bearings 117 which are interposed between the shaft and the bearing ring 114. These bearings absorb radial loads on the turret shaft.

The turret shaft carries the top part or head section 11 which mounts the locking mechanism 26 and the lobe 23. The turret shaft is adapted to be rotated by hydraulically controlled rack and pinion mechanism in the base section 110. This mechanism is shown in FIGURE 16.

The turret shaft 116 carries a pinion 120 which meshes with the racks 121 and 122 respectively connected to the pistons 123 and 124. The pistons operate in the cylinders 125 and 126 which are respectively formed in the mounting block 112. The position of the pistons, as shown in FIGURE 16, determines the location of the turret head for the transfer operation or as shown in FIGURE 10. For determining or locating the position of the turret head for the transfer operation, the endcaps 130 and 131 and the abutments 132 and 133 are finished so that when the pistons are bottomed, as shown, the turret head will be in the desired position. The head is held in the transfer position by maintaining oil pressure in the chamber 134 and 135. To reverse the position of the turret head, the chambers 134 and 135 are connected to discharge and fluid is made to enter the chambers 140 and 141 until the pistons are bottomed on the endcaps 142 and 143. The abutments 144 and 145 on the pistons and the endcaps 142 and 143 are finished so that when the pistons are bottomed, the turret head is in the approximate working position, however, reliance is not placed on the bottoming of the pistons to determine the exact location of the turret head in the working position. The mechanism for accomplishing this will be explained shortly.

The bottoming of the pistons as shown in FIGURE 16 to determine the transfer position of the turret head is made possible to a large extent, by the floating suspension of the tool holder carriers. Without this type of suspension, it would be necessary to provide additional means for precisely determining the transfer position so that engaging surfaces on the magazine head and tool holder would be in exact alignment.

The turret head 111 is fixed to the turret shaft 116. As indicated in FIGURES 10 and 11, the head is a hollow round structure carrying the lobe 23 on one side. The locking mechanism 26 is carried in the interior of the head which is closed off by the cover 151.

The mechanism for locating and locking the turret in its working position so that the tool is accurately aligned with the rotational axis of the spindle will be described below.

With reference to FIGURES 10, 14 and 15 it will be observed that the bottom, outside portion of the turret head 111 carries an outer ring 152. This ring 152 is fixed to and rotates with the head. Also it will be noted that the bearing ring 114 carries an inner ring 153. The ring 153 is fixed to the bearing ring and is non-rotatable. The rings are separated by an annular space 154.

With particular reference to FIGURES 14 and 15, it will be observed that the inner ring 153 is provided with a pair of diametrically opposed V-shaped slots 155 and 156. The outer ring 152 has similar slots 159 and 160.

It is pointed out here that the rings 152 and 153 are precision made and it is preferred that the same be manufactured from a single blank which is machined and ground to the shape and tolerances for the two rings and then the slots, which will ultimately form the slots 155, 156, 159 and 160, are machined and ground in the blank. Then the center of the blank is machined out to form the two separate rings 152 and 153. In this way, the ring 152 can be connected with the turret head and the ring 153 connected with the bottom part of the turret so that in one particular relative rotational position of the top and bottom parts of the turret the slots 155 and 159 and 156 and 161 will be very accurately radially aligned.

The desired radial alignment of the slots is accomplished by means of precision shoes which are adapted to be moved into the slots to not only accurately align the same but prevent relative rotation between the rings, hence, between the top and bottom parts of the turret. This action locates the turret head so that the tool carried thereby is correctly positioned and the head and tool are held in this position during the working operation.

The shoe for the grooves 155 and 159 is best seen in FIGIRE 15 as indicated by the numeral 161. The shoe 161 has a shape which is identical to that of the slots 155 and 160. A similar shoe 162 is provided for the slots 156 and 160.

As will be apparent both of the shoes 161 and 162 are housed in the annular space formed by the inside, by the bearing ring 114 and by the bottom of the turret head.

In order to insure that the shoes 160 and 162 always maintained the same radial position with respect to the rotational axis E in the turret, that is to say, a plane containing the axis E bisects or contains the axes of the shoes 161 and 162. Each of the shoes is provided with wings. For example, as seen in FIGURE 14 the shoe 161 has the wings 163 and 164 and the shoe 162 has the wings 165 and 166. These wings prevent the shoes from cocking.

It will be noted that the shoe 161 is connected to a downwardly extending piston rod 170 and the shoe 162 is connected to a similar rod 171. The piston rod 170 is connected to a piston 172 operating in the cylinder 173 formed in the mounting block. The piston rod 171 is connected to a piston 174 operating in the cylinder 175 formed in the mounting block. A spring 176 operates to urge the piston 174 in an upward direction. A similar spring 180 reacts on the piston 172.

As will be apparent when chambers 181 and 182 are connected to drain, the spring will force the pistons upwardly and cause the shoes 160 and 161 to move upwardly to the positions shown in FIGURE 10 and 15. When fluid flows into the chambers 181 and 182, the pistons and shoes are moved downwardly so that the shoes engage in the slots. The pistons are actuated to move the shoes into the slots when the turret has been rotated to a point where it is substantially in the working position and the shoes are maintained in the slots during all of the time that the tool is working the blank or workpiece. After the working operation has been completed and it is desired to rotate the turret head to transfer position, the pistons are moved upwardly (by the springs) to free the shoes from the slots.

It will be appreciated by those skilled in the art that the slots 159 and 160 on the movable ring 152 bear a predetermined relationship with the datum points 103, tool holder, shank and the lobe socket. Also it will be appreciated that the slots 155 and 156 on the fixed ring bear a predetermined and accurate relationship with the rotational axis of the spindle. It is the function of the shoes to always place the slots 159 and 160 in the same relative rotational position with respect to the slots 155 and 156. This insures the accuracy of tool disposition.

In rotating the turret to the working position, it will be recalled that the pistons 123 and 124 are bottomed on the caps 142 and 143. This places the turret in the desired rotational position for the shoes to be moved into the respective slots. However, at this time the pressure in the chambers 134, 135, 140 and 141 is relieved so that in the event there is any misalignment in the radial position of the inner and outer slots, the shoe in coming down into engagement with the slots can easily turn the turret ahead.

Referring to FIGURE 10, it will be noted that the bottom part of the outer ring 152 is in engagement with the top part of the flange 115 of the bearing ring 114. The engagement takes place over an annular area which is of substantial width and length. This engagement area constitutes an axial thrust bearing for the turret head 111. By tightening the nut for the bearings 117, the axial bearing can be preloaded to an extent which will not require undue force to rotate the turret head. This bearing structure is an important part of the invention in that it provides for necessary rotary turret motion, yet gives maximum axial rigidity, minimizes possible distortion of the turret parts and is conductive to keeping the tool in its desired working position.

The foregoing structure forms a very important part of the invention particularly because it insures that each time that the turret is rotated to the working position, the tool will bear a predetermined and consistent relationship with the rotational axis of the workpiece. In addition to this locating function, the above described structure provides a means for positively and securely locking the tool in its desired position during the working operation.

Another advantage of the engaging surface forming the axial thrust bearing is that the two surfaces are always in engagement and therefore it is virtually impossible for chips to enter between the surfaces and destroy the alignment between the base and head sections of the turret.

As mentioned heretofore, the tool holder locking mechanism 25 plays an important part in the invention and its structure will be described below.

As seen in FIGURE 11 the locking mechanism 26 has been actuated so as to lock the shank 93 in the socket 94. The arm 190 carries a locking head 191 and a release head 192. The locking head 191 engages a ledge or locking surface 193. The release head 192 engages the release surface 193a. The arm 190 is pivotally supported by the pin 194, the top end of which (FIGURE 10) is held by the cover 151 and the bottom end by the bottom part of the turret head 111. The arm 190 is adapted to be rotated about the pin 194 as by a hydraulically controlled toggle mechanism.

A pin 195 in the arm 190 carries a pair of toggle arms, one on the top side of the arm and one on the bottom side of the arm, the top side toggle arm being indicated at 196. The toggle arms carried by the pin 195 are connected to a pin 200 which is carried by a piston rod 201. A similar pair of upper and lower toggle arms, the top arm being indicated at 202 are carried by a pin 203 which is supported on its top end by the cover 151 and on the bottom end by the bottom part of the turret head 111. The piston rod 202 is connected to a piston (not shown) within the cylinder 204 which is rotatably mounted on a pin 205. The top end of the pin 205 is supported in the cover 151 and the lower end is supported in the bottom of the turret head. It will be apparent that with motion of the piston rod the arm 190 will swing about the pivot 194. For example, if the piston rod 201 is moved in a direction indicated by the arrow 206, the arm will swing clockwise so as to move the locking head 191 into the socket 94 and cause the same to engage with the locking surface 193. On the other hand, if the piston rod is moved rearwardly or to the direction indicated by the arrow 207, the arm will move counterclockwise so as to disengage the locking head 191 and the surface 193. This counterclockwise motion of the arm 190 brings the releasing head 192 into the socket 94 and into engagement with the release surface 193a on the end of the shank and applies a force to the shank so as to move the same just a few thousandths of an inch or enough to break the engagement between the conical surface of the shank and the conical surface of the socket.

In the toggle arrangement described, it will be apparent that in the locking position considerable force is exerted by the locking head 191 on the surface 193. This insures that the shank is securely locked in the socket. The set screw 208 can be adjusted to limit or to determine the ultimate stroke of the piston in the direction of the arrows 206.

The manner in which the various hydraulic mechanisms mentioned above are operated will be explained in connection with FIGURE 17.

The control of fluid to and from the various hydraulic mechanisms is controlled by solenoid operated valves. The energizing and de-energizing of the solenoids is controlled by relays forming a part of the overall automatic control system for the lathe. The description of the hydraulic circuits below will be in accordance with tool changing sequence, i.e., where a working operation has been completed and the turret rotated from working to transfer position, the magazine moved in to pick up the used tool holder, moved away from the turret and rotated to bring a new tool holder into registry and then move forward to deposit the new tool holder in the magazine then move back toward the tailstock and the turret rotated from transfer to working position with the new tool.

Thus, in FIGURE 17 assume that the automatic cycle of the lathe has reached the point where the tool has finished working the piece and the carriage and cross slide have traversed away from the work.

In FIGURE 17 the hydraulic circuit includes a hydraulic pump 210 operated by a motor 211. The discharge side of the pump feeds a pressure line 212 which is interconnected to the various valves V–1, V–2, V–3, V–4 and V–5. The valve V–1 is operated by the solenoid Sol–A, the valve V–2 by the solenoid Sol–B and Sol–C, the valve V–3 by the solenoid Sol–D, the valve V–4 by the solenoid Sol–E and the valve V–5 by the solenoid Sol–F.

As shown in FIGURE 17 the solenoid Sol–A has been de-energized so that the valve spring 213 operates the valve spool to interconnect the pressure line 212 with the line 214 running to the turret locating and clamping cylinders 181 and 182. With fluid in the chambers 181 and 182 the pistons 172 and 174 are moved downwardly so that the shoes 160 and 161 are clamping the turret head in working position.

The solenoids Sol–B and Sol–C are both de-energized so that the valve spool has connected drain line 215 with lines 216 and 217 so that any fluid in each of the chambers 136, 141, 140 and 134 can run to drain. This is the condition of the chambers for locking the turret with the shoes 161 and 162.

Also the solenoid D has been de-energized so that the valve spring 220 operates the valve spool so that the pressure line 212 is connected with the line 222 and the drain line 215 is connected with line 221. Fluid from line 222 entering chamber 47 causes the piston 43 to move the magazine head toward the tailstock.

The solenoid E is de-energized so that the spring 223 causes the valve spool to interconnect the pressure line 212 with line 225 and the drain line 215 with line 224. Thus the chamber 226 is connected to drain and with fluid entering the chamber 227 (from line 225) the piston 230 moves the piston rod 201 so that the tool holder is locked in the turret.

Also, the solenoid Sol–F is de-energized so that the valve spring 231 moves the spool to block fluid flow to the line 232 to the hydraulic motor 62. The magazine head then is non-rotatable.

The first step in exchange of tool is to unlock the turret head so the same can be rotated. To do this the solenoid Sol–A is energized. This moves the valve spool to interconnect the line 214 with the drain line 215. Thus the chambers 181 and 182 in the turret head are connected to the drain and springs 176 and 180 move the shoes upwardly to unlock the turret. The turret is now in position for turning.

To rotate the turret the solenoid Sol–B is energized and the valve spool is moved so that the line 216 is connected to the pressure line 212 and the line 217 is connected to the drain line 215. With the line 216 connected to pressure, fluid flows into the chamber 134 and the chamber 135. With the line 217 connected to drain, the fluid in the chambers 140 and 141 can discharge. Thus the pistons 123 and 124 are moved and the turret is caused to rotate from the working position to the transfer position.

To pick up the tool in the turret it is necessary that the magazine be moved toward the headstock and for this purpose the solenoid Sol–D is energized. This moves the spool against the pressure of spring 220 so that the spool interconnects the pressure line 212 with the line 221 and the drain line 215 with the line 222. Thus, fluid can flow into the chamber 48 and fluid in the chamber 47 can discharge. Thus the piston 43 is moved toward the headstock carrying the magazine with it. As the magazine moves toward the headstock to the transfer position, the dovetails on the carrier and the dovetails on the tool holder interengage and a detent falls into place.

As the magazine head is moving toward the headstock but before the time of engagement of the dovetails, the locking mechanism operates to loosen the tool holder in the socket. For this purpose the solenoid Sol–E is energized and this operates against the pressure of spring 223 so that the valve spool connects the pressure line 212 with the line 224 and connects the drain line 215 with the line 225. Thus fluid can enter into the chamber 226 and exit from the chamber 227 in the cylinder 204. The piston 230 then is moved to swing the locking arm counterclockwise so that the locking head is disengaged with the ledge and the ejector head blank engages the shank to loosen the same. At this junction then the tool holder is loose in the socket and the dovetails have ben engaged and the holder is in condition to be removed from the socket. For this purpose the magazine is moved back toward the tailstock.

For moving the magazine toward the tailstock, the solenoid Sol–D is de-energized so that the spring 220 moves the valve spool to interconnect the pressure line 212 with the line 222 and interconnect the drain line 215 with the line 221. Thus fluid can flow into the chamber 47 and exit from the chamber 48. This causes the piston 43 and the magazine head to move toward the tailstock (to the position shown in FIG. 17). With the magazine head clear, the head is rotated until the desired tool holder is in the registry position.

For rotating the magazine head the hydraulic motor 62 is energized and this is done by the energizing of the solenoid Sol–F. The solenoid moves the valve spool against the pressure of the spring 231 to connect the pressure line 212 with the line 232 and the motor 62 begins to rotate the magazine head. A rotation continues (step-by-step) until such time as the correct holder is brought into registry position by the operation of the coding system as explained heretofor. When the correct holder is brought into registry position, the circuits controlling the operation of the lathe function to de-energize the solenoid Sol–F so that the spring 231 moves the valve spool to cut off the connection between the pressure line 212 and the line 232. The motor 62 stops rotating.

With a new tool holder in registry position, the magazine is then moved toward the headstock. To do this the solenoid Sol–D is again energized to interconnect the pressure line 212 with the line 221 and the discharge lines 215 with the line 222. Fluid flows into the chamber 48 and exits from the chamber 47 so that the piston and the magazine head move toward the tailstock or until the shank on the tool holder enters into the cavity in the turret. The tool holder now is in position to be locked in the turret.

For locking the tool holder in the socket, the solenoid Sol–E is de-energized so that the spring 223 moves the spool to interconnect the pressure line 212 with the line 225 and drain line 215 with the line 224. Fluid can enter the chamber 227 and exit from the chamber 226 so that the piston 230 moves to rotate the arm clockwise and cause the locking head to engage the ledge on the shank. With the tool holder locked in the turret, the turret is now in a condition to be rotated to the working position. However, before this is done the magazine is moved out of the way or towards the tailstock.

For moving the magazine toward the tailstock, the solenoid Sol–E is de-energized so that the spring 220 moves the spool to interconnect the pressure line 212 with the line 222 and the drain line 215 to the line 221. Fluid can enter the chamber 47 and exit from the chamber 48 so that the magazine is moved toward the tailstock. When the magazine has reached its farthermost position toward the tailstock, the turret is rotated.

To rotate the turret to the working position the solenoid Sol–B is de-energized and the solenoid Sol–C is energized so that the valve spool is moved to interconnect the fluid pressure line 212 with the line 217 and to interconnect the drain line 215 with the line 216. Thus, fluid flows into the chambers 141 and 140 to cause the pistons to move and so rotate the turret. The turret is rotated until the pistons are bottomed. At this time pressure on the chambers 134, 135, 140 and 141 is relieved. To do this the solenoid Sol–C is de-energized (solenoid Sol–B is already de-energized) so that the valve spool connects both of the lines 216 and 217 to the drain line 215. (Incidentally, it is here noted that the lines 216 and 217 are interconnected by the valve only when both the solenoids Sol–B and Sol–C are de-energized.) With pressure relieved the turret head locating locking shoes 161 and 162 are ready to be moved into position. To do this the solenoid Sol–A is de-energized so that the spring 213 moves the valve spool to interconnect the pressure line 212 with the line 214. Thus fluid flows into the chambers 181 and 182 to move the pistons 172 and 174 downwardly against the springs and the two shoes 160 and 161 move into their respective slots to precisely locate the turret and its working position and hold the same in that position while the tool performs an operation on the workpiece.

After the tool has worked the piece, the carriage and slide move the tool outwardly under rapid traverse and the cycle of changing tool is again repeated as described above.

I claim:

1. In tool changing and supporting apparatus for a machine tool having a bed, magazine apparatus comprising:
   a frame member on the bed;
   cylinder means connected with said frame member and a piston mounted in said cylinder for reciprocating motion along the cylinder axis;
   first support mechanism and second support mechanism;
   means connecting said first support mechanism with said piston for reciprocating motion therewith;
   means mounting said second support mechanism on said first support mechanism for rotation about said axis relative to the first support mechanism and for reciprocating motion therewith;
   a plurality of tool holder carriers;
   means respectively mounting said tool holder carriers on said second support mechanism so as to be respectively disposed about said axis; and
   drive means connected between said first and second support mechanisms for rotating the second support mechanism.

2. A construction in accordance with claim 1 wherein the means mounting a tool holder carrier includes mechanism permitting limited motion of the carrier in directions along and transverse said axis.

3. In tool changing and supporting apparatus for a machine tool having a bed, magazine apparatus comprising:
   a frame member on said bed;
   an annular-shaped magazine head for storing a plurality of tools;
   a plurality of carrier means on said head for releasably holding a plurality of tool holders, the carriers being spaced from one another in a generally circular arrangement about an axis;
   cylinder means connected with said frame member and extending co-axially with said axis and a piston mounted in said cylinder for reciprocating motion along the axis; and
   means connecting said head with said piston for reciprocating motion therewith and for rotation of the head relative to the piston about said axis.

4. In tool changing and supporting apparatus for a machine tool having a bed, magazine apparatus comprising:
   a frame member on said bed;
   elongated means connected adjacent to the top of said frame and extending outwardly from the frame to form a cantilever support;
   a first annular shaped bushing slidably mounted on said support for reciprocating motion therewith;
   drive means inside of said support and connected with said bushing for reciprocating the same;
   a second annular shaped bushing mounted on said first bushing to partake of the axial motion of the first bushing and to be rotatable on the first bushing;
   a plurality of tool holder carriers spaced about the periphery of said second bushing and connected thereto, each carrier having means for supporting a tool holder; and
   means on said first bushing for rotating said second bushing.

5. A construction in accordance with claim 4 wherein said drive means comprises a cylinder formed by the interior of said support and further including a piston in said cylinder, an axially extending slot in said support and a pin connected to said piston and extending through said slot and engaged with said first bushing.

6. A construction in accordance with claim 4 wherein said means for rotating said second bushing is an intermittently operated drive rotating the bushing in step-by-step fashion.

7. A construction in accordance with claim 6 further including coding mechanism comprising switches fixed to said first bushing and arms connected with said second bushing to energize one or more switches for each rotary position of said second bushing, the coding mechanism being for use in stopping the rotation of the second bushing when the same is in a desired rotary position.

8. A construction in accordance with claim 4 wherein each carrier is connected to the rotary bushing by means which permits limited axial and radial motion of the carrier.

9. A construction in accordance with claim 4 further including means connected with said rotary bushing and disposed on opposite sides of said carriers and spaced from one another to form a peripheral slot, the slot being for use in accommodating the rotation of tool holders connected to the carriers.

10. In tool changing and supporting apparatus for a machine tool having a bed, magazine apparatus comprising:
    a frame member on said bed;
    carrier support means connected with said frame for rotation about an axis and for reciprocating motion along the axis;
    a plurality of tool holder carriers disposed around said support in circular like fashion, each carrier having means for mounting a tool holder and the carriers being rotatable and reciprocal with said support; and
    for each carrier means connecting the carrier with said support to provide for limited motion of the carrier in directions along and transverse said axis when the carrier is engaged with a tool holder.

11. A construction in accordance with claim 10 wherein last said means comprises a radially extending pin in the carrier and an axially extending pin in the carrier, the extremities of the radially extending pin fitting into an aperture in the support which is of larger diameter than the pin, and the extremities of the axially extending pin each extending into an aperture which is of larger diameter than the pin.

12. A construction in accordance with claim 10 wherein each said carrier is U-shaped in cross section, the U forming an opening which extends in a direction generally parallel said axis.

13. A construction in accordance with claim 12 wherein the carrier means for mounting a tool holder comprises dovetails which are adapted to engage corresponding dovetails on a tool holder.

14. A construction in accordance with claim 13 wherein each carrier has a spring loaded plunger which is adapted to engage a detent on a holder when the same is engaged with said dovetails.

15. In tool changing and supporting apparatus for a machine tool having a bed, magazine apparatus comprising:
    a frame member on said bed;
    a support connected with said frame;
    an annular shaped magazine head having means for releasably holding a plurality of tool holders spaced from one another in a generally circular arrangement about an axis;
    mechanism connecting said magazine head with said support for rotation about said axis and for movement along said axis; and
    a pair of members forming part of said magazine, said mechanism connecting the members with said support so that the members move axially with the head but are non-rotatable, the spacing of the members forming a peripheral slot to accommodate rotation of the tool holders rotating with the magazine.

References Cited by the Examiner
UNITED STATES PATENTS

| | | | |
|---|---|---|---|
| 1,270,121 | 6/1918 | Cox | 77—25 |
| 2,534,333 | 12/1950 | Wyrick. | |
| 3,133,349 | 5/1964 | Riedel | 29—568 |

WILLIAM W. DYER, Jr., *Primary Examiner.*

LEONIDAS VLACHOS, *Examiner.*

UNITED STATES PATENT OFFICE
CERTIFICATE OF CORRECTION

Patent No. 3,296,903　　　　　　　　　　　　　　　January 10, 1967

William C. E. Coate

It is hereby certified that error appears in the above numbered patent requiring correction and that the said Letters Patent should read as corrected below.

Column 3, line 69, for "illusrtated" read -- illustrated --; column 12, line 57, for "conductive" read -- conducive --; line 74, for "25" read -- 26 --; column 15, line 2, for "ben" read -- been --; column 16, line 64, for "therewith" read -- thereon --.

Signed and sealed this 26th day of September 1967.

(SEAL)

Attest:

ERNEST W. SWIDER

Attesting Officer

EDWARD J. BRENNER

Commissioner of Patents